(12) United States Patent
Zhao et al.

(10) Patent No.: US 12,631,298 B2
(45) Date of Patent: May 19, 2026

(54) REBOUND COMPOSITE ELECTROMAGNETIC ENERGY DISSIPATION DEVICE FOR REDUCING SLOSHING WITH LIQUID-FILLED BALL FOR LARGE LIQUEFIED NATURAL GAS (LNG) STORAGE TANK

(71) Applicants: GUANGXI UNIVERSITY, Nanning (CN); DALIAN UNIVERSITY OF TECHNOLOGY, Dalian (CN)

(72) Inventors: Yi Zhao, Nanning (CN); Ke Yang, Nanning (CN); Hongnan Li, Nanning (CN); Miao Cui, Nanning (CN)

(73) Assignees: GUANGXI UNIVERSITY, Nanning (CN); DALIAN UNIVERSITY OF TECHNOLOGY, Dalian (CN)

( * ) Notice: Subject to any disclaimer, the term of this patent is extended or adjusted under 35 U.S.C. 154(b) by 69 days.

(21) Appl. No.: 18/964,199

(22) Filed: Nov. 29, 2024

(65) Prior Publication Data

US 2025/0129897 A1 Apr. 24, 2025

Related U.S. Application Data

(63) Continuation of application No. PCT/CN2024/091472, filed on May 7, 2024.

(30) Foreign Application Priority Data

Mar. 26, 2024 (CN) .......................... 202410346848.3

(51) Int. Cl.
*F17C 13/12* (2006.01)
*F16F 7/10* (2006.01)
*F16F 7/112* (2006.01)

(52) U.S. Cl.
CPC .......... *F17C 13/126* (2013.01); *F16F 7/1011* (2013.01); *F16F 7/112* (2013.01);
(Continued)

(58) Field of Classification Search
CPC ............ F17C 13/126; F17C 2205/0196; F17C 2223/0161; F17C 2260/016;
(Continued)

(56) References Cited

U.S. PATENT DOCUMENTS

2024/0034437 A1* 2/2024 Sun ........................... B63B 1/38
2024/0182137 A1* 6/2024 Sun ........................... B63B 1/38

FOREIGN PATENT DOCUMENTS

CN 103492261 A 1/2014
CN 112963726 A 6/2021
(Continued)

*Primary Examiner* — Rafael A Ortiz
(74) *Attorney, Agent, or Firm* — Muncy, Geissler, Olds & Lowe, P.C.

(57) ABSTRACT

The present invention relates to a rebound composite electromagnetic energy dissipation device for reducing sloshing with a liquid-filled ball for a large liquefied natural gas (LNG) storage tank. When the liquid surface sloshes around, the gas spring is pulled by the steel strand to produce vertical displacement and provide a restoring force, and the vertical displacement of the gas spring drives the fan blades on the sleeves of the ball screws at the bottom to rotate in the damping fluid, consuming energy. The present invention uses hydraulic transmission instead of mechanical transmission of traditional piston motion, and the horizontal pistons produce horizontal displacement in the case of pressure unbalance, thus increasing the flexibility of horizontal piston motion; magnets are arranged in the horizontal slideways and the horizontal pistons to intensify the motion of the horizontal pistons and the relative motion between horizontal pistons and the interior.

8 Claims, 3 Drawing Sheets

(52) U.S. Cl.
CPC ... *F16F 2222/06* (2013.01); *F16F 2230/0011*
(2013.01); *F16F 2232/06* (2013.01); *F17C*
*2205/0196* (2013.01); *F17C 2223/0161*
(2013.01); *F17C 2260/016* (2013.01); *F17C*
*2270/0134* (2013.01)

(58) Field of Classification Search
CPC . F17C 2270/0134; F16F 7/1011; F16F 7/112;
F16F 2222/06; F16F 2230/0011; F16F
2232/06
USPC ........................................................ 220/694
See application file for complete search history.

(56) References Cited

FOREIGN PATENT DOCUMENTS

| CN | 113653935 | * | 11/2021 |
|----|-----------|---|---------|
| CN | 113653935 | A | 11/2021 |
| CN | 117450202 | * | 1/2024 |
| JP | 2006036217 | A | 2/2006 |
| JP | 2010189045 | A | 9/2010 |
| JP | 2011184087 | A | 9/2011 |
| KR | 20150044543 | A | 4/2015 |
| KR | 20200140602 | A | 12/2020 |

* cited by examiner

Liquid surface

REBOUND COMPOSITE ELECTROMAGNETIC ENERGY DISSIPATION DEVICE FOR REDUCING SLOSHING WITH LIQUID-FILLED BALL FOR LARGE LIQUEFIED NATURAL GAS (LNG) STORAGE TANK

TECHNICAL FIELD

The present invention belongs to the technical field of damping, particularly the technical field of reducing sloshing of stored liquid in large liquefied natural gas (LNG) storage tanks, and relates to an electromagnetic energy dissipation device for reducing sloshing for a large LNG storage tank.

BACKGROUND

LNG is a liquid that natural gas becomes after being compressed and cooled to $-162°$ C. Compared with the traditional coal and petroleum, LNG is cleaner and more efficient green energy. An LNG storage tank relates to the technical field of major urban lifeline engineering, and the ability thereof to withstand natural disasters such as earthquakes is an important reference index. Under the action of the earthquakes, the storage tank will lose the functions, which will cause a fire or explosion, thereby endangering the safety of personnel and property in the surrounding areas and causing serious economic losses.

Under the action of the earthquakes, the liquid in the LNG storage tank will slosh around, which will cause additional hydrodynamic pressure on the wall of the storage tank and affect the safety of the storage tank structure. The sloshing liquid may also have a direct impact on the ceiling, which causes damage to pipe joints and accessories. To reduce the seismic response of the LNG storage tank, base isolation is adopted. It is found from research that an isolation system can effectively reduce the seismic response of the storage tank structure. However, after isolation, the sloshing wave height of the liquid may be increased, and the sloshing of the liquid surface will be aggravated. Therefore, to ensure the safety of the storage tank structure, it is necessary to design a device that can effectively reduce the sloshing wave height of the stored liquid to solve the existing practical problems.

SUMMARY

The present invention provides a device for reducing sloshing that can effectively reduce the sloshing wave height of a liquid surface in a large LNG storage tank, which can significantly reduce liquid sloshing amplitude, thus weakening the influence of liquid sloshing caused by earthquakes on the storage tank structure.

To achieve the above purpose, the present invention adopts the following technical solution:

A rebound composite electromagnetic energy dissipation device for reducing sloshing with a liquid-filled ball for a large LNG storage tank, which is installed inside a tank body of an LNG storage tank. The device for reducing sloshing for an LNG storage tank comprises: a liquid-filled ball 1, and a steel strand 2, a sealed support shell 3, a gas spring 4, ball screws 5, horizontal pistons 6 and a vertical piston 7 which are arranged below the liquid-filled ball 1.

The liquid-filled ball 1 is a sealed hollow ball filled with damping fluid, and the damping fluid should be a fluid with a lower density than the LNG stored liquid, occupying half the volume of the ball, so that the ball can float on the liquid surface of the LNG storage tank. The steel strand 2 is used for connecting the liquid-filled ball 1 and the vertical piston 7, that is, the upper end of the steel strand 2 is fixed below the liquid-filled ball 1, and the lower end is fixed on a semicircular buckle at the top of the vertical piston 7.

The sealed support shell 3 comprises a horizontal structure and a vertical structure and is an integrated structure fixed on the bottom surface of the LNG storage tank, the horizontal structure is composed of two hollow slender cylinder structures arranged along a cross shape and is defined as a horizontal slideway, the central intersection point of which is provided with a vertical structure, and the vertical structure is also a hollow slender cylinder structure and is defined as a vertical slideway, the radius of which is twice that of the horizontal slideway. By welding four groups of reinforcing meshes 22 at the interface of the horizontal structure and the vertical structure inside the sealed support shell 3, the sealed support shell 3 is divided into horizontal slideways pairwise perpendicular in four directions and one vertical slideway perpendicular to a plane where the horizontal slideways are located.

The gas spring 4 is located in the vertical slideway, the upper end of the gas spring 4 is fixed on the lower bottom surface of the vertical piston 7, and the lower end is fixed on the inner side of the bottom surface of the sealed support shell 3. The gas spring 4 is used for preventing the vertical piston 7 from leaving the vertical slideway to ensure normal operation of the device and provide an elastic restoring force for the liquid-filled ball 1. The ball screws 5 are located in the vertical slideway, a sleeve of each ball screw 5 is provided with a fan blade in the same position as the gas spring 4, the upper ends of the ball screws 5 are fixed on the lower bottom surface of the vertical piston 7, and the lower ends are fixed on the inner side of the bottom surface of the sealed support shell 3. The upper end of each ball screw 5 is connected with the vertical piston 7 by a first roller 21, the sleeve of the ball screw 5 is fixed on the shaft washer of the first roller 21, the vertical piston 7 is fixed on the housing washer of the first roller 21, and the ball screw 5 and the vertical piston 7 are not in contact with each other, that is, the rotation of the sleeve of the ball screw 5 and the vertical displacement of the vertical piston 7 do not affect each other.

The horizontal pistons 6 are hollow cylinders, the number of which is four, and are respectively installed in the four horizontal slideways in the sealed support shell 3. Each hollow cylinder is arranged horizontally, the left and right end surfaces of the hollow cylinder are respectively provided with a first magnet 61, the side surface is provided with a second annular magnet 62, and magnetic poles of the second annular magnet 62 are radially magnetized, that is, the magnetic poles N and S are divided into two semicircular cylinders. A ball screw 63 is horizontally arranged in the horizontal piston 6, both ends of the screw rod of the ball screw 63 are vertically fixed on the left and right end surfaces of the horizontal piston 6 respectively, the sleeve of the ball screw 63 can be moved on the screw rod, the sleeve is provided with a composite metal fan blade 67, both ends of the sleeve are respectively provided with a third annular magnet 65, and the first annular magnet 61 is opposite the S pole of the third annular magnet 65 so that a repulsive force is generated when the two are close. The third annular magnet 65 is surrounded by a copper block 66, the copper block 66 serves as a bracket to keep the sleeve of the ball screw 63 horizontal, increase the internal structural quality and have diamagnetic properties, which is not affected by the second annular magnet 62 and is conducive to horizontal motion, and the motion of the copper block 66 in magnetic fields will also produce damping and consume energy. The sleeve of the ball screw 63 is connected with the third annular magnet 65 by a second roller 64, the sleeve of the ball screw 63 is fixed on the shaft washer of the second roller 64, the third annular magnet 65 is fixed on the housing washer of the second roller 64, and the two are not in contact with each other so that the third annular magnet 65 will not affect the rotation of the sleeve of the ball screw 63 during horizontal movement.

The lower half part of the vertical piston 7, that is, the cylindrical piston, is placed in the vertical slideway of the sealed support shell 3, the lower bottom surface of a cylindrical connecting rod at the upper half part is vertically fixed on the upper surface of the cylindrical piston and is extended upwards out of a combination support through the outer surface of the sealed support shell 3, and the end thereof is provided with a semicircular buckle. The lower end of the steel strand 2 is fixed on the semicircular buckle at the upper half part of the vertical piston 7, and the lower bottom surface of the vertical piston 7 is connected with the ball screws 5 and the gas spring 4. The sealed support shell 3 is divided into six sealed spaces by the vertical piston 7 and the four horizontal pistons 6, and the middle sealed space is filled with damping fluid. The pistons are fitted but not fixed to the wall surfaces of the slideways and can move. The six sealed spaces are respectively: one sealed space between the upper surface of the cylindrical piston of the vertical piston 7 and the top of the vertical structure, four sealed spaces between the four horizontal pistons 6 and the inner side of the horizontal structure, and one sealed space between the bottom of the vertical piston 7 and the inner sides of the four horizontal pistons.

The sealed support shell 3 is provided with vertical reinforcing meshes 22 at the vertical intersection positions of the horizontal slideways and the vertical slideway to prevent the horizontal pistons 6 from leaving the horizontal slideways. Both ends of each horizontal slideway of the sealed support shell 3 are provided with magnets 23, and the two magnets 23 are respectively fixed on the reinforcing meshes 22 and the sealed support shell 3.

Further, the screw rod of the ball screw 63 is vertically fixed on the left and right end surfaces of the horizontal piston 6 through inner rings of the first annular magnet 61, the second annular magnet 62 and the third annular magnet 63 respectively, and the diameter of the inner rings of the annular magnets is slightly larger than that of the screw rod.

Further, the N pole of the magnet 23 is opposite the N pole of the first annular magnet 61 installed on the left and right end surfaces of the horizontal piston 6.

Further, the sealed support shell 3 shall be made of a material meeting the strength requirements under the temperature condition of −162° C. and having diamagnetic properties, for example, aluminum alloy.

Further, piston rings are installed on the inner sides of the horizontal pistons 6 and the vertical piston 7 in the sealed support shell 3 so that the horizontal pistons 6 and the vertical piston 7 have sliding ability while ensuring the tightness of the six sealed spaces enclosed by the pistons and the sealed support shell 3.

Further, lubricating oil can be added between the horizontal pistons 6 and the copper block 66 therein to reduce friction.

Further, the composite metal fan blade 67 inside the horizontal piston 6 is made of a lightweight and high-strength conductive material such as aluminum alloy to generate heat and achieve energy dissipation.

Further, the device for reducing sloshing for a large LNG storage tank can be adjusted in size as requested, and a plurality of devices for reducing sloshing can be placed in the LNG storage tank.

The use process of the present invention is:

When an earthquake occurs, the stored liquid in the large LNG storage tank sloshes around, driving the liquid in the liquid-filled ball 1 to slosh around in an opposite direction. At this time, the liquid-filled ball can be regarded as a tuned liquid damper (TLD). Due to the flexibility property of the liquid, the liquid surface of the stored liquid in the large LNG storage tank will slosh around up and down so that the stored liquid will impact the bottom of the liquid-filled ball 1 to create a tensile force on the steel strand 2. The tensile force is transferred to the vertical piston 7 and then to the gas spring 4 through the vertical piston 7. At this time, the gas spring 4, the vertical piston 7 and the steel strand 2 are vertically displaced together to drive the sleeve of the ball screw 5 to produce vertical displacement. Since the bottom of the screw rod of the ball screw 5 is vertically fixed on the inner side of the bottom surface of the sealed support shell 3, the sleeve of the ball screw 5 of the first roller 21, which is fixed on the bottom surface of the vertical piston 7, will rotate when producing vertical displacement, and the fan blade installed on the sleeve will rotate to form dissipation damping.

Meanwhile, since the whole sealed support shell 3 is closed, the pressure of the six sealed spaces divided by the pistons is in a balanced state under the initial condition. When the vertical piston 7 is displaced, the vertical piston 7 will first break the balanced state, and the whole system will be in an unbalanced state, resulting in horizontal displacement of the horizontal pistons 6 in the horizontal slideways. The magnet 23 fixed on the sealed support shell 3 and the reinforcing mesh 22 is opposite the N pole of the first annular magnet 61 fixed on the inner sides of the left and right end surfaces of the horizontal piston 6. When the horizontal piston 6 slides inside the horizontal slideway, the magnet 23 and the first annular magnet 61 will get close to each other to generate a repulsive force, thus intensifying the motion of the horizontal piston 6 in the horizontal slideway. Meanwhile, the third annular magnet 65 and the copper block 66 placed inside the horizontal piston 6 will produce relative displacement to the horizontal piston 6 due to inertia, the first annular magnet 61 fixed on the inner sides of the left and right end surfaces of the horizontal piston 6 is opposite the S pole of the third annular magnet 65 embedded in the copper block 66, and a repulsive force will be generated when the distance between the two becomes shorter, thus intensifying the relative motion between the horizontal piston 6 and the copper block 66 and the third annular magnet 65 which are arranged in the horizontal piston 6.

Since the screw rod of the ball screw 63 is vertically fixed on the left and right end surfaces of the horizontal piston 6, the sleeve of the ball screw 63 is fixed on the assembly of the third annular magnet 65 and the copper block 66, that is, the relative motion between the horizontal piston 6 and the copper block 66 and the third annular magnet 65 which are arranged in the horizontal piston 6 evolves into the motion between the screw rod and sleeve of the ball screw 63 so that the sleeve rotates, and the composite metal fan blade 67 fixed on the sleeve starts to rotate. The side surface of the horizontal piston 6 is provided with the second annular magnet 62 which is radially magnetized, that is, the magnetic poles N and S are divided into two semicircular cylinders, and the composite metal fan blade 67 rotates in a magnetic field generated by the second annular magnet 62 to produce damping and dissipate energy. At the same time, the motion of the copper block 66 in the magnetic field will also produce damping and consume energy.

Compared with the prior art, the present invention has the beneficial effects that:

1) The device for reducing sloshing provided by the present invention utilizes reverse motion between the liquid in the liquid-filled ball located above and the stored liquid in the storage tank, and the liquid-filled ball at the liquid surface serves as a TLD. Due to the flexibility property of the liquid, the liquid surface will slosh around up and down so that the steel strand produces a tensile force, and the gas spring located below will produce vertical displacement due to the presence of the tensile force and provide a restoring force. The principle is simple, practical and efficient. Meanwhile, the vertical displacement of the gas spring will drive the fan blades on the sleeves of the ball screws at the bottom to rotate in the damping fluid, consuming energy.

2) The device for reducing sloshing provided by the present invention uses hydraulic transmission instead of mechanical transmission of traditional piston motion and utilizes pressure unbalance to make the horizontal pistons produce horizontal displacement, thus increasing the flexibility of horizontal piston motion. Magnets are arranged in the horizontal slideways and the horizontal pistons to intensify the motion of the horizontal pistons and the relative motion between the horizontal pistons and the interior so that the device for reducing sloshing consumes energy more efficiently. The motion of the horizontal pistons towards the outer sides of the horizontal slideways is conducive to the recovery of the gas spring, and the system components are complementary and mutually beneficial.

3) The structure of the present invention is simple and easy to install, and the energy dissipation efficiency is high through the synergistic effect of energy dissipation technologies, which can reduce the influence of earthquakes on the structure of the large LNG storage tank.

IN THE FIGURES

Figure 1:
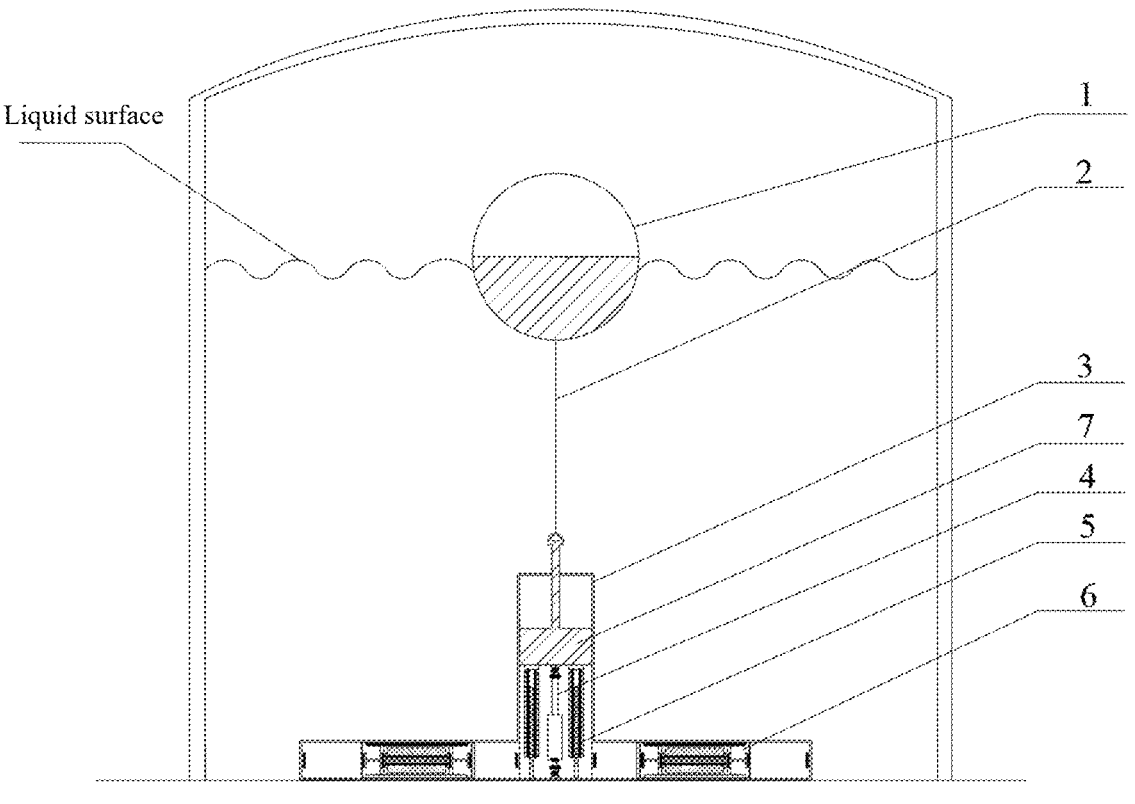
FIG. 1 is a structural schematic diagram of a device for reducing sloshing for a large LNG storage tank in the present invention.
Figure 2:
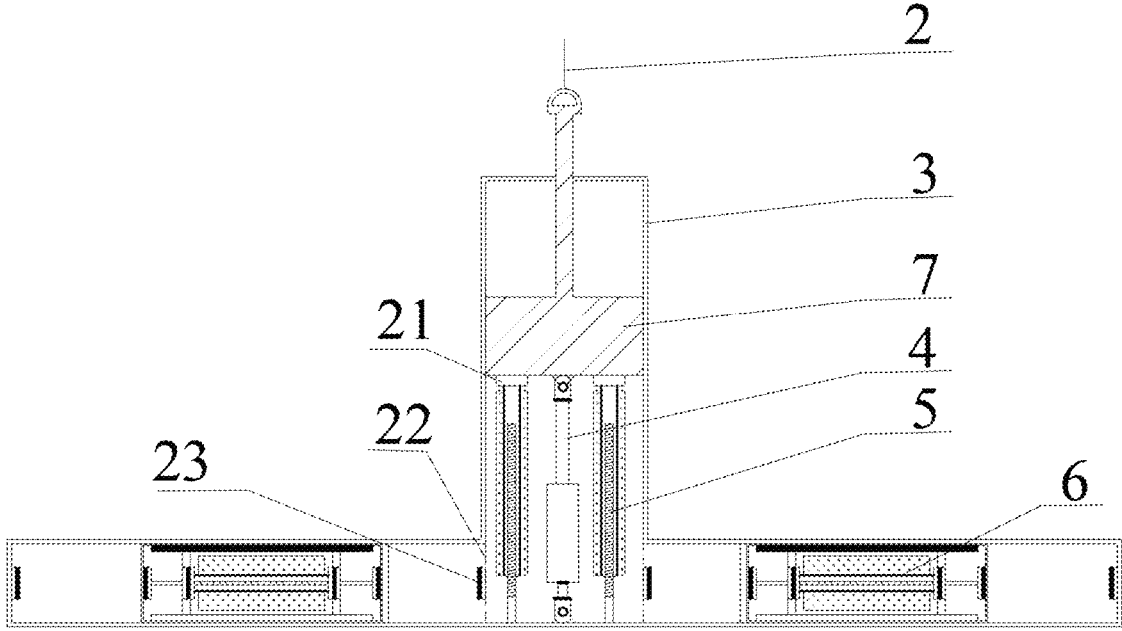
FIG. 2 is a structural schematic diagram of a combination support in the present invention.
Figure 3:
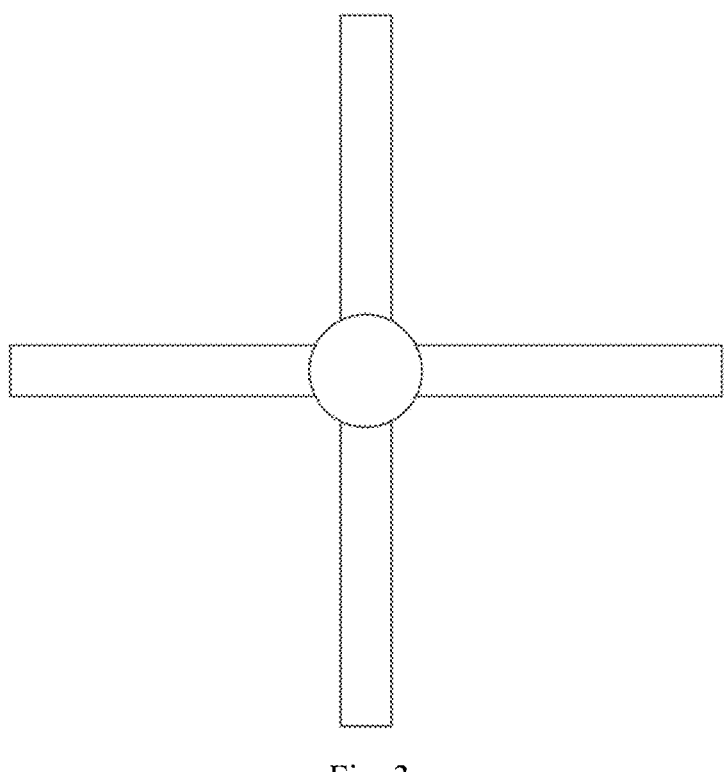
FIG. 3 is a top view of FIG. 2.
Figure 4:
FIG. 4 is a structural schematic diagram of a gas spring.

1 liquid-filled ball, 2 steel strand, 3 sealed support shell, 4 gas spring, 5 ball screw, 6 horizontal piston, and 7 vertical piston;

21 first roller, 22 reinforcing mesh, and 23 magnet;

61 first annular magnet, 62 second annular magnet, 63 ball screw, 64 second roller, 65 third annular magnet, 66 copper block, and 67 composite metal fan blade.

DETAILED DESCRIPTION

The contents of the present invention are further described below in detail in combination with the drawings and specific embodiments, but not limited to the contents in the description.

EMBODIMENT

The present embodiment provides a device for reducing sloshing of a large LNG storage tank, comprising a liquid-filled ball 1, a steel strand 2, a sealed support shell 3, a gas spring 4, ball screws 5, horizontal pistons 6 and a vertical piston 7.

As shown in FIGS. 1, 2, 3 and 4, in a large LNG storage tank,

The liquid-filled ball 1 is a sealed hollow ball filled with damping fluid, and the damping fluid should be a fluid with a lower density than the LNG stored liquid, occupying half the volume of the ball, so that the ball can float on the LNG liquid surface. 9% nickel steel with stable properties in the LNG stored liquid is selected as the material of the hollow shell of the liquid-filled ball 1. The steel strand 2 is used for connecting the liquid-filled ball 1 and the vertical piston 7, the upper end of the steel strand 2 is fixed below the liquid-filled ball 1, and the lower end is fixed on a semicircular buckle of the vertical piston 7. The sealed support shell 3 comprises a horizontal structure and a vertical structure and is an integrated structure fixed on the bottom surface of the LNG storage tank, the horizontal structure is composed of two hollow slender cylinder structures arranged along a cross shape and is called a horizontal slideway, the central intersection point of which is provided with a vertical structure, and the vertical structure is also a hollow slender cylinder structure and is called a vertical slideway, the radius of which is twice that of the horizontal slideway. The sealed support shell 3 is divided into horizontal slideways pairwise perpendicular in four directions and one vertical slideway by welding four groups of reinforcing meshes 22 at the interface of the horizontal structure and the vertical structure inside, the reinforcing meshes 22 are used for preventing the horizontal pistons from leaving the slideways, and magnets 23 are installed on the sealed support shell 3 and the reinforcing meshes 22. The number of the horizontal pistons 6 is four, which are respectively installed in the four horizontal slideways in the sealed support shell 3. The lower half part of the vertical piston 7, that is, the cylindrical piston, is placed in the vertical slideway of the sealed support shell 3, the lower bottom surface of a cylindrical connecting rod at the upper half part is vertically fixed on the upper surface of the cylindrical piston and is extended upwards out of a combination support through the outer surface of the sealed support shell 3, and the end thereof is provided with a semicircular buckle. The lower end of the steel strand 2 is fixed on the semicircular buckle at the upper half part of the vertical piston 7, and the lower bottom surface of the vertical piston 7 is connected with the ball screws 5 and the gas spring 4. The sealed support shell 3 is divided into six sealed spaces by the vertical piston 7 and the four horizontal pistons 6, and the middle sealed space is filled with damping fluid. The six sealed spaces are respectively: one sealed space between the upper surface of the cylindrical piston of the vertical piston 7 and the top of the vertical structure, four sealed spaces between the four horizontal pistons 6 and the inner side of the horizontal structure, and one sealed space between the bottom surface of the vertical piston 7 and the inner sides of the four horizontal pistons.

Figure 5:
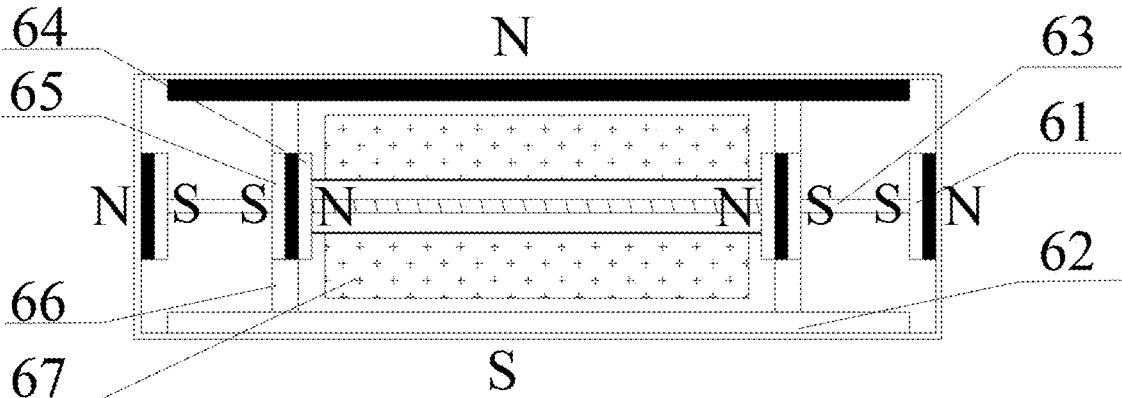
FIG. 5 is a structural schematic diagram of a horizontal piston in the present invention.

As shown in FIG. 5, the horizontal pistons 6 are hollow cylinders, the number of which is four, and are respectively installed in the four horizontal slideways in the sealed support shell 3. The upper and lower bottom surfaces, that is, the left and right end surfaces of each hollow cylinder installed horizontally, and the side surface are provided with a first annular magnet 61 and a second annular magnet 62, and magnetic poles of the second annular magnet 62 are radially magnetized, that is, the magnetic poles N and S are divided into two semicircular cylinders. A ball screw 63 is arranged in the horizontal piston 6, both ends of the screw rod of the ball screw 63 are vertically fixed on the left and right end surfaces of the horizontal piston 6 respectively, the sleeve of the ball screw 63 can be moved on the screw rod, the sleeve is provided with a fan blade, both ends of the sleeve are respectively provided with a third annular magnet 65, and the first annular magnet 61 is opposite the S pole of the third annular magnet 65 so that a repulsive force is generated when the two are close. The third annular magnet 65 is surrounded by a copper block 66, the copper block 66 serves as a bracket to keep the sleeve of the ball screw 63 horizontal, increase the internal structural quality and have diamagnetic properties, which is not affected by the second annular magnet 62 and is conducive to horizontal motion, and the motion of the copper block 66 will produce heat and consume energy.

Figure 6:
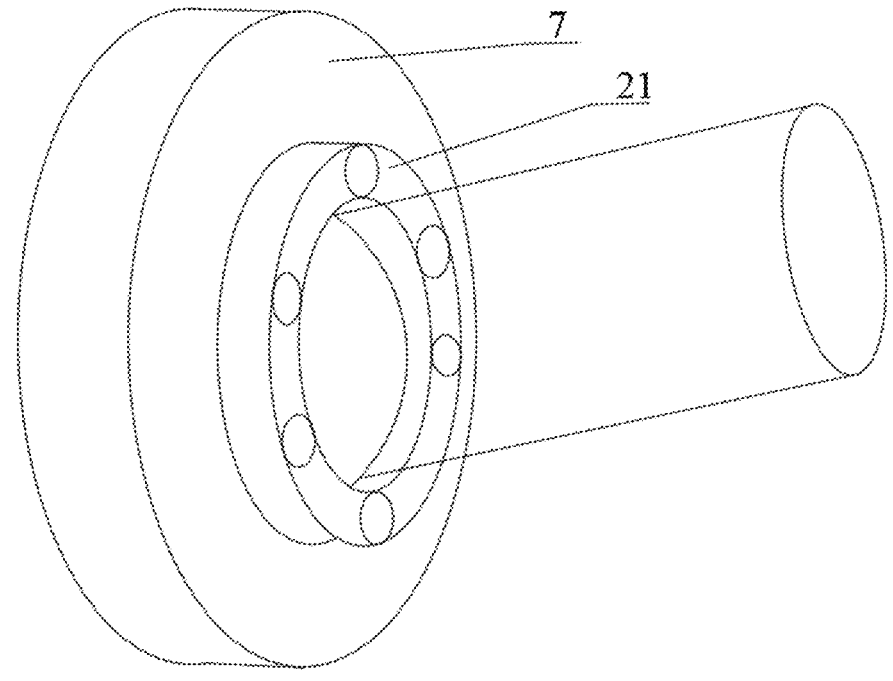
FIG. 6 is a structural schematic diagram of connection of a roller.

FIG. 6 shows connection between the sleeve of the ball screw 5 and the vertical piston 7, the sleeve of the ball screw 5 is fixed on the shaft washer of a first roller 21, the vertical piston 7 is fixed on the housing washer of the roller, and the two are not in contact with each other, that is, the rotation of the sleeve of the ball screw 5 and the vertical displacement of the vertical piston 7 do not affect each other. This figure is also applicable to connection between a second roller 64 and the sleeve of the ball screw 63, the shaft washer of the second roller 64 is fixedly connected with the sleeve of the ball screw 63, the housing washer is fixedly connected with the third annular magnet 65, and the sleeve of the ball screw 63 and the third annular magnet 65 are not in contact with each other, ensuring that the translation of the magnet does not affect the rotation of the sleeve.

When an earthquake occurs, the stored liquid in the large LNG storage tank sloshes around, driving the liquid in the liquid-filled ball 1 to slosh around in an opposite direction. At this time, the liquid-filled ball can be regarded as a TLD. Due to the flexibility property of the liquid, the liquid surface of the stored liquid in the large LNG storage tank will slosh around up and down so that the stored liquid will impact the bottom of the liquid-filled ball 1 to create a tensile force on the steel strand 2. The tensile force is transferred to the vertical piston 7 and then to the gas spring 4 through the vertical piston 7. At this time, the gas spring 4, the vertical piston 7 and the steel strand 2 are vertically displaced together. Since the screw rod of the ball screw 5 is vertically fixed on the inner side of the bottom surface of the sealed support shell 3, the sleeve of the ball screw 5 of the first roller 21, which is fixed at the bottom of the vertical piston 7, will rotate when producing vertical displacement, and the fan blade will rotate to form dissipation damping. Since the whole sealed support shell 3 is closed, the pressure of the six sealed spaces divided by the pistons is in a balanced state under the initial condition. When the vertical piston 7 is displaced, the vertical piston 7 will first break the balanced state, and the whole system will be in an unbalanced state, resulting in horizontal displacement of the horizontal pistons 6 in the horizontal slideways. The magnet 23 fixed on the sealed support shell 3 and the reinforcing mesh 22 is opposite the N pole of the first annular magnet 61 fixed on the inner sides of the left and right end surfaces of the horizontal piston 6. When the horizontal piston 6 slides inside the horizontal slideway, the magnet 23 and the first annular magnet 61 will get close to each other to generate a repulsive force, thus intensifying the motion of the horizontal piston 6 in the horizontal slideway. Meanwhile, the third annular magnet 65 and the copper block 66 placed inside the horizontal piston 6 will produce relative displacement to the horizontal piston 6 due to inertia, the first annular magnet 61 fixed on the inner sides of the left and right end surfaces of the horizontal piston 6 is opposite the S pole of the third annular magnet 65 embedded in the copper block 66, and a repulsive force will be generated when the distance between the two becomes shorter, thus intensifying the relative motion between the shell of the horizontal piston 6 and the copper block 66 and the third annular magnet 65 which are arranged in the horizontal piston 6. Both ends of the screw rod of the ball screw 63 are vertically fixed on the left and right end surfaces of the horizontal piston 6 respectively, the sleeve of the ball screw 63 is fixed on the assembly of the third annular magnet 65 and the copper block 66, that is, the relative motion between the horizontal piston 6 and the copper block 66 and the third annular magnet 65 which are arranged in the horizontal piston 6 evolves into the relative motion between the screw rod and sleeve of the ball screw 63 so that the sleeve rotates, and the composite metal fan blade 67 fixed on the sleeve starts to rotate. The side surface of the horizontal piston 6 is provided with the second annular magnet 62 which is radially magnetized, that is, the magnetic poles N and S are divided into two semicircular cylinders, and the composite metal fan blade 67 rotates in a magnetic field to produce damping and dissipate energy. At the same time, the motion of the copper block 66 in the magnetic field will also produce damping and consume energy.

In the present embodiment, the joint of the vertical piston 7 and the top surface of the vertical structure of the sealed support shell 3 shall be sealed well using the prior art, which can not only ensure that the straight rod can pass freely through the sealed support shell 3, but also ensure the tightness inside the sealed support shell 3. The sealed support shell 3 shall be made of a material meeting the strength requirements under the temperature condition of −162° C. and having diamagnetic properties, for example, aluminum alloy.

The initial condition of the present invention is to control the gas spring 4 so that the horizontal pistons 6 are compressed by the damping liquid to get close to the outer sides of the slideways. Under this condition, when the gas spring 4 is subjected to a vertical upward tensile force, the upper half part of the gas spring still has the ability to displace upwards.

The above embodiments only express the implementation of the present invention, and shall not be interpreted as a limitation to the scope of the patent for the present invention. It should be noted that, for those skilled in the art, several variations and improvements are made without departing from the concept of the present invention, all of which belong to the protection scope of the present invention.

The invention claimed is:

1. A rebound composite electromagnetic energy dissipation device for reducing sloshing with a liquid-filled ball for a large liquefied natural gas (LNG) storage tank, wherein the device for reducing sloshing is installed inside a tank body of a large LNG storage tank, which can reduce the sloshing wave height of a liquid surface and the liquid sloshing amplitude; and the device for reducing sloshing for an LNG storage tank comprises: a liquid-filled ball (1), and a steel strand (2), a sealed support shell (3), a gas spring (4), ball screws (5), horizontal pistons (6) and a vertical piston (7) which are arranged below the liquid-filled ball (1);

the liquid-filled ball (1) is a sealed hollow ball filled with damping fluid and can float on the liquid surface of the LNG storage tank; and the steel strand (2) is used for connecting the liquid-filled ball (1) and the vertical piston (7), that is, the upper end of the steel strand (2) is fixed below the liquid-filled ball (1), and the lower end is fixed at the top of the vertical piston (7);

the sealed support shell (3) comprises a horizontal structure and a vertical structure and is an integrated structure fixed on the bottom surface of the LNG storage tank, the horizontal structure is composed of two hollow slender cylinder structures arranged along a cross shape and is defined as a horizontal slideway, the central intersection point of which is provided with a vertical structure, and the vertical structure is also a hollow slender cylinder structure and is defined as a vertical slideway; and by welding reinforcing meshes (22) at the interface of the horizontal structure and the vertical structure inside the sealed support shell (3), the sealed support shell (3) is divided into horizontal slideways pairwise perpendicular in four directions and one vertical slideway perpendicular to a plane where the horizontal slideways are located;

the vertical piston (7) is placed in the vertical slideway of the sealed support shell (3), the upper end is extended out of the vertical slideway and connected with the steel strand (2), the lower end is connected with the ball screws (5) and the gas spring (4), the gas spring (4) is used for preventing the vertical piston (7) from leaving the vertical slideway to ensure normal operation of the device and provide an elastic restoring force for the liquid-filled ball (1), and a sleeve of each ball screw (5) is provided with a fan blade; the number of the horizontal pistons (6) is four, which are respectively installed in the four horizontal slideways in the sealed support shell (3); and the sealed support shell (3) is divided into six sealed spaces by the vertical piston (7) and the four horizontal pistons (6), the middle sealed space is filled with damping fluid, and the pistons are fitted but not fixed to the wall surfaces of the slideways and can move.

2. The rebound composite electromagnetic energy dissipation device for reducing sloshing with a liquid-filled ball for a large liquefied natural gas (LNG) storage tank according to claim 1, wherein the horizontal pistons (6) in the horizontal slideways respectively have a structure as follows:

each horizontal piston (6) is a hollow cylinder which is arranged horizontally, the left and right end surfaces of the hollow cylinder are respectively provided with a first magnet (61), the side surface is provided with a second annular magnet (62), and the second annular magnet (62) is radially magnetized, which means that magnetic poles N and S are divided into two semicircular cylinders; a ball screw (63) is horizontally arranged in the horizontal piston (6), both ends of the screw rod of the ball screw (63) are vertically fixed on the left and right end surfaces of the horizontal piston (6) respectively, the sleeve of the ball screw (63) can be moved on the screw rod, the sleeve is provided with a composite metal fan blade (67), both ends of the sleeve are respectively provided with a third annular magnet (65), and the first annular magnet (61) is opposite the S pole of the third annular magnet (65) so that a repulsive force is generated when the two are close; the third annular magnet (65) is surrounded by a copper block (66); the sleeve of the ball screw (63) is connected with the third annular magnet (65) by a second roller (64), the sleeve of the ball screw (63) is fixed on the shaft washer of the second roller (64), the third annular magnet (65) is fixed on the housing washer of the second roller (64), and the two are not in contact with each other so that the third annular magnet (65) will not affect the rotation of the sleeve of the ball screw (63) during horizontal movement; and both ends of each horizontal slideway of the sealed support shell (3) are provided with magnets (23), the outer end is fixed on the inner wall of the sealed support shell (3), and the inner end is fixed on the reinforcing mesh (22).

3. The rebound composite electromagnetic energy dissipation device for reducing sloshing with a liquid-filled ball for a large liquefied natural gas (LNG) storage tank according to claim 2, wherein the magnets (23) are opposite the N pole of the first annular magnet (61) installed on the left and right end surfaces of the horizontal piston (6); and the first annular magnet (61) fixed on the inner sides of the left and right end surfaces of the horizontal piston (6) is opposite the S pole of the third annular magnet (65) embedded in the copper block (66).

4. The rebound composite electromagnetic energy dissipation device for reducing sloshing with a liquid-filled ball for a large liquefied natural gas (LNG) storage tank according to claim 1, wherein piston rings are installed on the inner sides of the horizontal pistons (6) and the vertical piston (7) in the sealed support shell (3) so that the horizontal pistons (6) and the vertical piston (7) have sliding ability while ensuring the tightness thereof with the sealed support shell (3).

5. The rebound composite electromagnetic energy dissipation device for reducing sloshing with a liquid-filled ball for a large liquefied natural gas (LNG) storage tank according to claim 1, wherein the radius of the vertical slideway is twice that of the horizontal slideway.

6. The rebound composite electromagnetic energy dissipation device for reducing sloshing with a liquid-filled ball for a large liquefied natural gas (LNG) storage tank according to claim 1, wherein the upper end of the gas spring (4) in the vertical slideway is fixed on the lower bottom surface of the vertical piston (7), and the lower end is fixed on the inner side of the bottom surface of the sealed support shell (3); the upper ends of the ball screws (5) are fixed on the lower bottom surface of the vertical piston (7), and the lower ends are fixed on the inner side of the bottom surface of the sealed support shell (3); and each ball screw (5) is connected with the vertical piston (7) by a first roller (21), the sleeve of the ball screw (5) is fixed on the shaft washer of the first roller (21), the vertical piston (7) is fixed on the housing washer of the first roller (21), and the ball screw (5) and the vertical piston (7) are not in contact with each other so that the rotation of the sleeve of the ball screw (5) and the vertical displacement of the vertical piston (7) do not affect each other.

7. The rebound composite electromagnetic energy dissipation device for reducing sloshing with a liquid-filled ball for a large liquefied natural gas (LNG) storage tank according to claim 1, wherein the device for reducing sloshing for a large LNG storage tank is adjusted in size as requested, and a plurality of devices for reducing sloshing are placed in the LNG storage tank.

8. The rebound composite electromagnetic energy dissipation device for reducing sloshing with a liquid-filled ball for a large liquefied natural gas (LNG) storage tank according to claim 2, wherein when an earthquake occurs, the stored liquid in the large LNG storage tank sloshes around:

the liquid surface of the stored liquid sloshes around up and down to impact the bottom of the liquid-filled ball (1) to create a tensile force on the steel strand (2), the tensile force is transferred to the gas spring (4) through the vertical piston (7), and at this time, the gas spring (4), the vertical piston (7) and the steel strand (2) are vertically displaced together to drive the sleeve of the ball screw (5) to produce vertical displacement; and since the bottom of the screw rod of the ball screw (5) is vertically fixed on the inner side of the bottom surface of the sealed support shell (3), the sleeve of the ball screw (5) will rotate when producing vertical displacement, and the fan blade installed on the sleeve will rotate to form dissipation damping;

meanwhile, since the whole sealed support shell (3) is closed, the sealed spaces are in a balanced state under the initial condition, and when the vertical piston (7) is displaced along with the gas spring (4), the vertical piston (7) first breaks the balanced state, and the whole system will be in an unbalanced state, resulting in horizontal displacement of the horizontal pistons (6) in the horizontal slideways; the magnet (23) fixed on the sealed support shell (3) and the reinforcing mesh (22) is opposite the N pole of the first annular magnet (61) fixed on the inner sides of the left and right end surfaces of the horizontal piston (6), and when the horizontal piston (6) slides inside the horizontal slideway, the magnet (23) and the first annular magnet (61) will get close to each other to generate a repulsive force, thus intensifying the motion of the horizontal piston (6) in the horizontal slideway; and meanwhile, the third annular magnet (65) and the copper block (66) placed inside the horizontal piston (6) will produce relative displacement to the shell of the horizontal piston (6) due to inertia, the first annular magnet (61) fixed on the inner sides of the left and right end surfaces of the horizontal piston (6) is opposite the S pole of the third annular magnet (65) embedded in the copper block (66), and a repulsive force will be generated when the distance between the two becomes shorter, thus intensifying the relative motion between the horizontal piston (6) and the copper block (66) and the third annular magnet (65) which are arranged in the horizontal piston (6);

since the screw rod of the ball screw (63) is vertically fixed on the left and right end surfaces of the horizontal piston (6), the sleeve of the ball screw (63) is fixed on the third annular magnet (65) and the copper block (66), the screw rod of the ball screw (63) drives the sleeve thereon to rotate, and the composite metal fan blade (67) fixed on the sleeve starts to rotate; and the side surface of the cylinder wall of the horizontal piston (6) is provided with the second annular magnet (62) which is radially magnetized, and the composite metal fan blade (67) rotates in a magnetic field generated by the second annular magnet (62) to produce damping and dissipate energy, and at the same time, the motion of the copper block (66) in the magnetic field will also produce damping and consume energy.

* * * * *